United States Patent Office 3,642,884
Patented Feb. 15, 1972

3,642,884
PROCESS FOR PURIFYING TEREPHTHALIC ACID
Fridolin A. Hoyer, East Aurora, N.Y., assignor to Allied Chemical Corporation, New York, N.Y.
No Drawing. Filed Aug. 8, 1969, Ser. No. 848,749
Int. Cl. C07c 51/42
U.S. Cl. 260—525     11 Claims

ABSTRACT OF THE DISCLOSURE

Process for removing color-forming impurities from crude terephthalic acid whereby the crude acid is dissolved in an aqueous solution of a sulfite salt of a β-hydroxy primary aliphatic amine, and the purified acid recovered by precipitation with a strong acid. The solvent solution can be recycled. This process provides rapid and complete dissolution of the terephthalic acid.

The present invention relates to an improved purification process for crude terephthalic acid. More particularly, the invention relates to purifying crude terephthalic acid by dissolving in a solution of a sulfite salt of a β-hydroxy primary aliphatic amine and reprecipitating the terephthalic acid.

BACKGROUND OF THE INVENTION

Terephthalic acid is a valuable precursor for the preparation of fiber forming polyesters, particularly polyethylene terephthalate. However, in order to form high molecular weight polyesters, the terephthalic acid starting material must be of high purity. Terephthalic acid is formed by various known methods, such as by catalytic liquid phase oxidation of p-xylene with a molecular oxygen-containing gas, or with nitrogen-containing oxidants such as nitric acid.

Crude terephthalic acid produced by such processes is contaminated by colored condensation and polymerization products, metal oxidation catalysts and color-forming oxidation by-products, particularly 4-carboxybenzaldehyde and p-toluic acid and the like, generally comprising about 2% by weight. Such contaminants are difficult to remove by conventional techniques such as recrystallization or washing with hot water or acetic acid. Terephthalic acid is difficultly soluble in water and most common organic solvents even at reflux temperatures. This further complicates purification of crude terephthalic acid.

SUMMARY OF THE INVENTION

It is an object of the present invention to provide an improved method for removing color-forming contaminants from crude terephthalic acid.

It is a further object to provide an improved solvent for crude terephthalic acid.

Further objects will become apparent from the following detailed description thereof.

It has been discovered that crude terephthalic acid can be purified by dissolving in an aqueous solution of a sulfite salt of a β-hydroxy primary aliphatic amine, and recovering purified terephthalic acid from the solution. The rate of dissolution of the crude terephthalic acid is improved over known solvents without contamination of the purified terephthalic acid. The solubilizing effect of the β-hydroxy primary aliphatic amines is selective, as for example, similar results are not obtained with the corresponding secondary or tertiary hydroxylamine sulfite salts.

In a presently preferred embodiment, terephthalic acid is dissolved in a 1–20% by weight aqueous solution containing from 1 to 3.5 equivalents of a sulfite salt of a β-hydroxy primary aliphatic amine per equivalent of terepthalic acid, the resultant solution contacted with activated carbon to assist in removing impurities and the purified terephthalic acid recovered by adding a strong acid to the solution to precipitate the terephthalic acid.

DETAILED DESCRIPTION OF THE INVENTION

Crude terephthalic acid is added to an aqueous solution of an amine sulfite salt, as hereinafter described, and heated to dissolved the acid, generally at temperatures of about 90–100° C. Higher temperatures, e.g. 150° C. or higher, can be employed under superatmospheric pressures but are not required. At least one equivalent of the amine sulfite salt is required for each equivalent of terephthalic acid, and preferably a small excess, in an amount of from 1.1 to 2 equivalents of the amine sulfite salt will be employed for each equivalent of terephthalic acid. Use of a larger excess, i.e. more than about 3.5 equivalent of amine sulfite salt per equivalent of terephthalic acid, although effective, is unnecessary.

The aqueous amine sulfite salt solution is a mixture of the sulfite and bisulfite salts of the amine in which the bisulfite salt predominates. Such solutions are readily obtained by charging sulfur dioxide to an aqueous solution of the β-hydroxylamine until a pH of below 3.0 is obtained, as determined by a Congo Red acid end point for example.

β-hydroxy primary aliphatic amines suitable for use in the invention include both straight chain, branched chain and alicyclic hydroxy-substituted amines wherein the primary amine group and one hydroxyl group are attached to adjacent carbon atoms. Representative amines include for example 2-ethanolamine, 2-hydroxy-n-propylamine, 2-aminopropanol, 2-aminobutanol-1, 2-amino-2-methylpropanol-1, 2-amino-2-ethyl-1,3-propanediol, 2-amino-3-pentanol, 3-amino-2-methylbutanol-2, 1-amino-2-methylbutanol-2, 3-aminohexanol-2, 4-amino-2-ethylpentanol-5, cis-2-aminocyclohexanol, 2-amino-1-dodecanol, and the like. Preferably the hydroxylamine compound has from 2 to 6 carbon atoms. Mixtures of the amines can also be employed.

The concentration of terephthalic acid in the amine sulfite salt solution as described hereinabove can be from about 1% to about 20% by weight, but preferably fairly dilute solutions of about 2–4% of terephthalic acid will be employed. Use of more dilute solutions, although effective, is inconvenient in that large quantities of solvent must be handled, requiring larger equipment and concomitant expense.

When the terephthalic acid is dissolved, the generally clear to lightly-colored solution may be treated with activated carbon in known manner. A suitable process is disclosed for example in U.S. Pat. 3,344,177. The terephthalic acid-amino salt solution is percolated through a bed of activated carbon at temperatures preferably of 20–30° C. at atmospheric pressure. This activated carbon treatment assists in removal of 4-carboxybenzaldehyde and p-toluic acid impurities, as well as catalyst residues and other by-products of p-xylene oxidation.

The purified terephthalic acid is recovered from solution by acidification with an acid stronger than terephthalic acid, such as sulfuric acid, sulfur dioxide, hydrogen chloride, hydrochloric acid, sulfurous acid, and the like, to a pH below 4.9, preferably in the range of 4.0 to 2.0 to ensure complete precipitation of the terephthalic acid. The precipitated terephthalic acid is separated from the solution in known manner, as by filtration, centrifugation and the like. The precipitate is then washed or slurried with water to remove residual acid and amine, and dried.

The crude terephthalic acid to be purified according to the invention preferably is obtained by oxidation of p-xylene in the presence of a molecular oxygen-containing gas by known methods such as with a heavy metal catalyst and bromine promoter; a cobalt salt catalyst and methyl ethyl ketone promoter; a cobalt salt catalyst and acetaldehyde promoter and the like.

In a preferred embodiment of the invention, the sulfur dioxide evolved during dissolution is collected and reserved. If desired, an inert gas such as nitrogen, can be passed through the mixture to aid in collecting the sulfur dioxide as it is formed. The sulfur dioxide is then passed to the acidification step when the terephthalic acid is precipitated. The acidified amine sulfite solution remaining as mother liquor after precipitation of the purified terephthalic acid is adjusted by adding alkanolamine sulfite salt if required and recycled to dissolve additional quantities of crude terephthalic acid.

The terephthalic acid purified in accordance with the process of the invention can be esterified directly with a glycol, e.g., ethylene glycol, and converted into high molecular weight polyesters suitable for forming into fibers of excellent color and quality.

The invention will be further illustrated by the following examples, but it is to be understood that the invention is not meant to be limited to the details described therein. In the examples, all parts and percentages are by weight.

EXAMPLE 1

53 parts of gaseous sulfur dioxide were bubbled through a solution of 49.5 parts of 2-aminoethanol in 100 parts of water while stirring and maintaining at about room temperature. The solution, which was now acid to Congo Red indicator, was diluted to 1200 parts by volume with water. 38.6 parts of crude terephthalic acid containing 0.6% of 4-carboxybenzaldehyde obtained by catalytic liquid phase air oxidation of p-xylene in the presence of an aldehyde promoter according to the process disclosed by J. Augustynowicz in U.S. Pat. 3,361,803 were added and the mixture stirred at about 100° C. After 5 hours, all of the terephthalic acid had dissolved. The solution was cooled to 80° C. and allowed to percolate through a column of activated carbon pellets. Sulfur dioxide was bubbled into the carbon treated solution to precipitate terephthalic acid which was filtered. The filtrate was recycled to dissolve an additional quantity of crude terephthalic acid.

The precipitate was washed with about 6000 parts of water and dried at 105–110° C. The terephthalic acid which was recovered in substantially quantitative yield, was free of nitrogenous impurities and contained less than 0.2% of 4-carboxybenzaldehyde.

EXAMPLES 2–5

Various other sulfite salt solutions were tried as solvents for crude terephthalic acid prepared as in Example 1.

The solvent for Example 2 was prepared by bubbling 55 parts of sulfur dioxide in an aqueous solution of a secondary amine comprising 84 parts of 2,2′-iminodiethanol diluted to 1500 parts by volume with water.

The solvent for Example 3 was prepared by bubbling 41 parts of sulfur dioxide in an aqueous solution of 81 parts of a tertiary amine comprising 2,2′,2″-nitrilotriethanol diluted to 1500 parts by volume with water.

The solvent for Example 4 was prepared by dissolving 225 parts of dipotassium sulfite in 687 parts of water.

The solvent for Example 5 was prepared by dissolving 560 parts of dipotassium sulfite in 2280 parts of water. The results are summarized below:

| Example: | Amount of terephthalic acid charged, parts | Temperature of dissolution, °C. | Time of dissolution, hours | Percent terephthalic acid dissolved |
|---|---|---|---|---|
| 2 | 46.5 | 90–100 | 42 | 51.6 |
| 3 | 31.6 | 90–100 | 24 | None |
| 4 | 117 | [1] 98 | 31 | 93 |
| 5 | 166 | [2] 159 | 2.2 | [2] 23.5 |

[1] 65 p.s.i.g.
[2] Potassium acid terephthalate precipitated.

I claim:

1. A method of purifying crude terephthalic acid obtained from the oxidation of p-xylene with a molecular oxygen-containing gas which comprises dissolving said acid in an aqueous solution of a sulfite salt of a β-hydroxy primary aliphatic amine, and recovering the purified terephthalic acid.

2. A method according to claim 1 wherein from 1.0 to 3.5 equivalents of sulfite salt is present for each equivalent of terephthalic acid.

3. A method according to claim 1 wherein the concentration of terephthalic acid in the solvent is from about 1.0 to about 20% by weight.

4. A method according to claim 1 wherein the aqueous solvent is prepared by bubbling sulfur dioxide through a solution of a β-hydroxy primary aliphatic amine until a pH of about 3.0 is obtained.

5. A method according to claim 1 wherein from 1.1 to about 2.0 equivalents of sulfite salt is present for each equivalent of terephthalic acid.

6. A method according to claim 1 wherein the concentration of terephathalic acid in the solvent is from about 2.0 to about 4.0% by weight.

7. A method according to claim 1 wherein purified terephthalic acid is recovered by precipitating the acid by addition of sulfur dioxide, separating the solid acid from the solution, washing the acid with water and drying.

8. A method according to claim 1 wherein the acid is dissolved at reflux temperatures.

9. A mthod according to claim 1 wherein the terephthalic acid solution is contacted with activated carbon.

10. A method of purifying terephthalic acid which comprises dissolving crude terephthalic acid obtained from the oxidation of p-xylene with a molecular oxygen-containing gas in an aqueous solution of a sulfite salt of a β-hydroxy primary aliphatic amine containing from 1.0 to 3.5 equivalents of sulfite salt per equivalent of terephathalic acid such that the concentration of terephthalic acid in the solvent is from about 1.0 to about 20% by weight at reflux temperature, contacting the solution with activated carbon to remove colored impurities, acidifying the solution to precipitate the purified terephthalic acid and recovering the precipitate.

11. A process according to claim 10 wherein the sulfur dioxide evolved during dissolution is reserved for the acidification step, and the mother liquor obtained after recovery of the terephthalic acid is recycled to the dissolution step.

References Cited

UNITED STATES PATENTS

| 2,245,311 | 6/1941 | White | 260—525 |
| 3,095,445 | 6/1963 | Baldwin et al. | 260—525 |

FOREIGN PATENTS

| 524,440 | 5/1956 | Canada | 260—525 |

LORRAINE A. WEINBERGER, Primary Examiner

R. S. WEISSBERG, Assistant Examiner